J. P. BARKER.
AUTOMATIC SAW SET.
APPLICATION FILED SEPT. 24, 1915.
1,188,144.
Patented June 20, 1916.
2 SHEETS—SHEET 1.
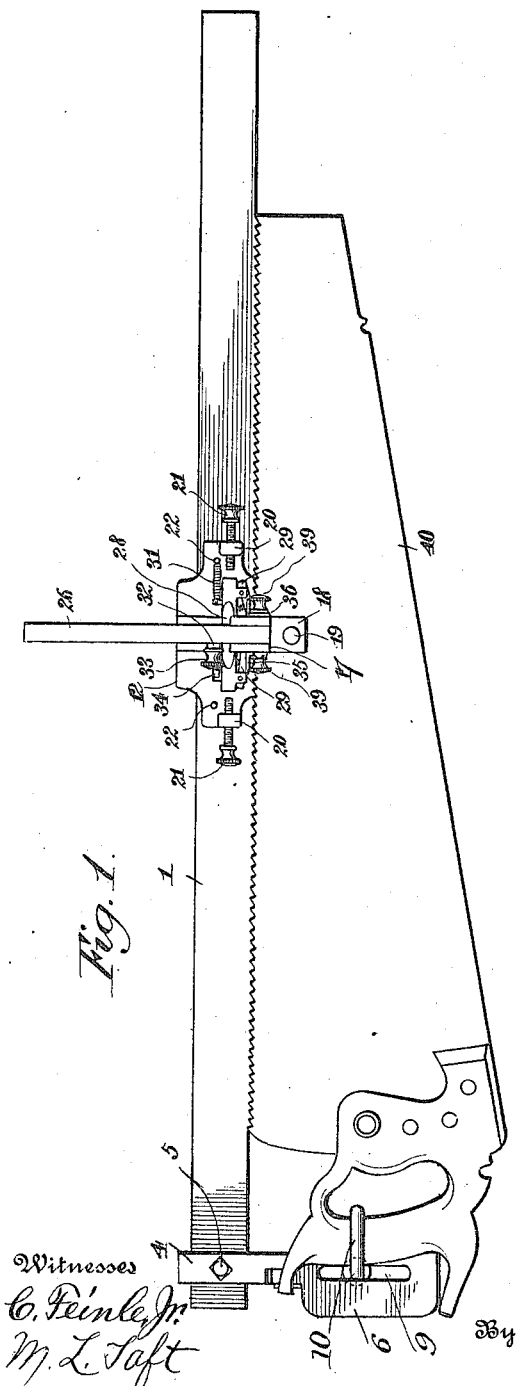
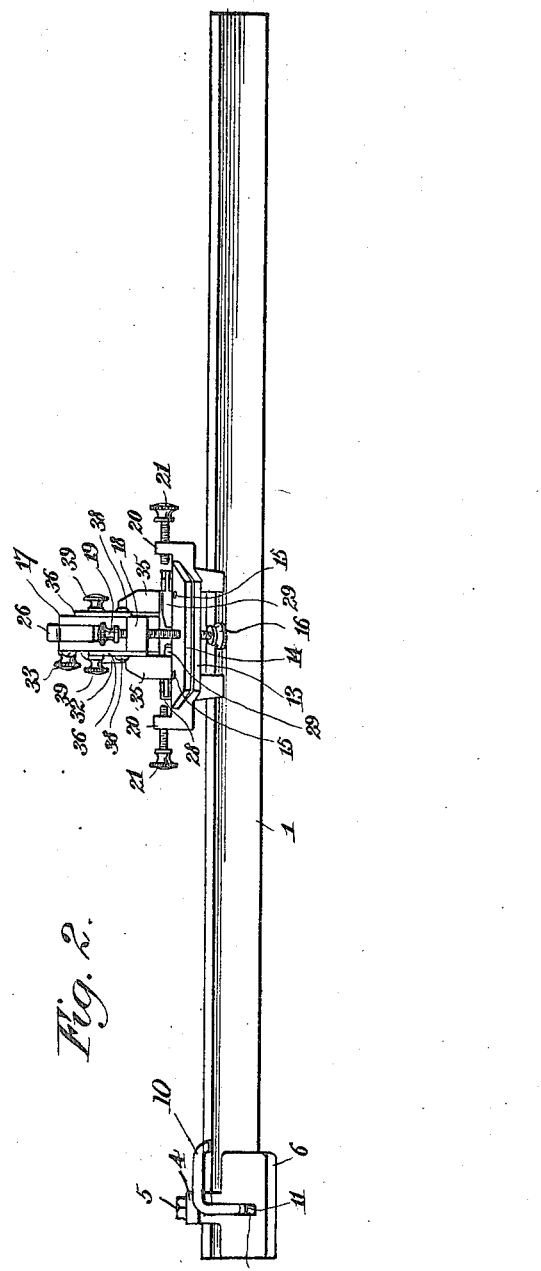
Inventor,
James P. Barker.
By Victor J. Evans,
Attorney.
Witnesses
C. Feinle, Jr.
M. L. Taft J. P. BARKER.
AUTOMATIC SAW SET.
APPLICATION FILED SEPT. 24, 1915.
1,188,144.
Patented June 20, 1916.
2 SHEETS—SHEET 2.
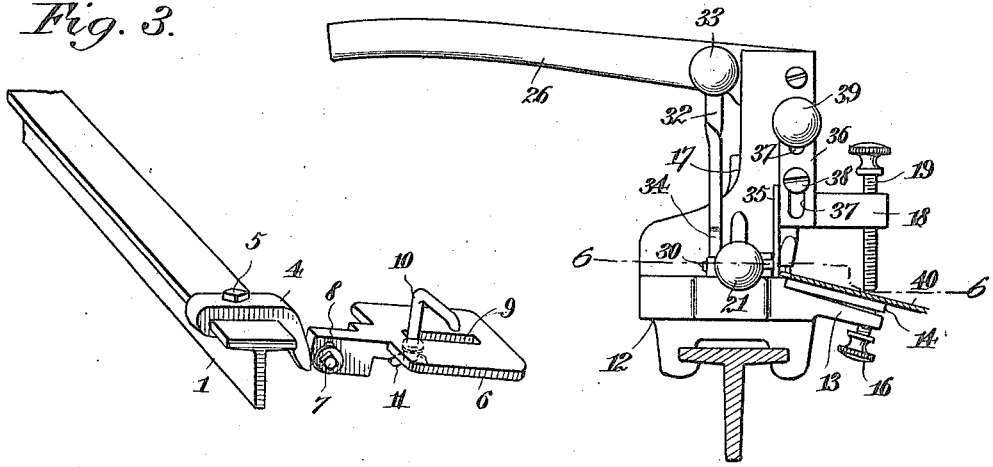
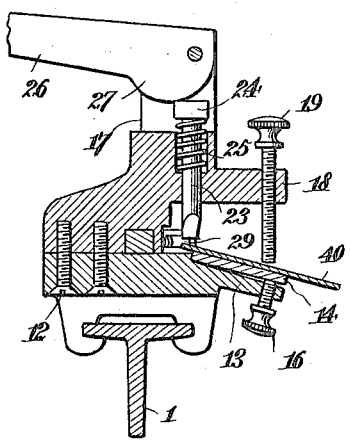
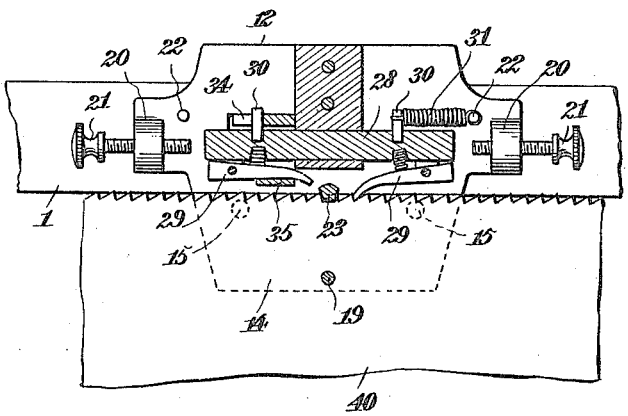
Witnesses:
Inventor,
James P. Barker.
By Victor J. Evans,
Attorney.
THE COLUMBIA PLANOGRAPH CO., WASHINGTON, D. C.

UNITED STATES PATENT OFFICE.

JAMES P. BARKER, OF RICHMOND, VIRGINIA.

AUTOMATIC SAW-SET.

1,188,144. Specification of Letters Patent. Patented June 20, 1916.

Application filed September 24, 1915. Serial No. 52,489.

*To all whom it may concern:*

Be it known that I, JAMES P. BARKER, a citizen of the United States, residing at Richmond, in the county of Henrico and State of Virginia, have invented new and useful Improvements in Automatic Saw-Sets, of which the following is a specification.

This invention relates to saw sets and it consists in the novel features hereinafter described and claimed.

An object of the invention is to provide in the form of a saw set a unitary assemblage of parts adapted to be used for swaging the teeth of the saw with relation to the body of the blade, there being provided means for regulating the angle at which the teeth are set with relation to the body of the blade. Also means are provided for holding the saw in position upon a bar, which in turn may be supported in a vise, or other holder. The swaging plunger is mounted for vertical movement in a standard, which in turn is mounted upon a block guided for movement along the bar. A lever is fulcrumed upon the standard and is provided with a cam end engageable with the end of the plunger for forcing the same in a downward direction. Spring means is provided for moving the plunger in an upward direction. A shuttle is mounted upon the block and carries at its opposite ends pivoted pawls adapted to engage the teeth of the saw, whereby the block may be moved along the bar. Spring means is provided for moving the shuttle in one direction, and a cam member is mounted upon the lever and is operatively connected with the shuttle for moving the same in the opposite direction. Adjustable screws are located in the path of movement of the shuttle for limiting the movements thereof. Guard members are mounted upon the standards and may be positioned in front of the pawls to hold one or the other of the pawls back from the teeth of the saw.

In the accompanying drawings: Figure 1 is a top plan view of the saw set. Fig. 2 is a side elevation of the same. Fig. 3 is a perspective view of an end portion of the saw set. Fig. 4 is a side elevation of the same showing the supporting bar and saw in section. Fig. 5 is a transverse sectional view of the saw set. Fig. 6 is a horizontal sectional view of the same taken on the line 6—6 of Fig. 4.

The saw set includes a bar 1 which is T-shaped in transverse section and a vise may be used for supporting the said bar by clamping the jaws of the vise against the opposite side portions of the stem flange of the bar. A clip 4 is also adapted to be mounted upon the bar 1 and is provided with a set screw 5, adapted, when tightened, to impinge against the bar, whereby the said clip is held at an adjusted position thereon. A bracket 6 is turnably held at one side of the clip 4, by means of a screw 7, which is threaded in the said clip and passes through a slot 8 provided in the bracket. The bracket 6 is further provided with a slot 9 which is disposed at a right angle to the long dimension of the bar 1. When a saw is in position upon the saw set, the bracket 6 supports the handle thereof, and a hook 10 passes through the slot 9 and the opening in the handle of the saw and the bill of the hook is adapted to engage against the sides of the saw handle. A wing nut 11 is threaded upon the lower end of the hook 10 and when tightened holds the said hook and saw handle in position.

A block 12 is pivotally mounted upon the bar 1 and is provided at one side with an inclined shelf 13. A plate 14 is loosely connected at its inner edge portion upon the shelf 13 by means of screws 15 or similar devices, and a screw 16 is threaded through the outer portion of the shelf 13 and bears at its upper end against the under side of the plate 14. The screw 16 may be adjusted in the shelf 13 to position the upper side of the plate 14 at a desired angle with relation to the upper surface of the block 12.

A standard 17 is erected upon the block 12. The standard 17 is provided at one side with a forwardly disposed lug 18 through which is threaded a screw 19. The lower end of the screw 19 is disposed above the upper surface of the plate 14. The block 12 is provided at its ends with upstanding lugs 20, through which are threaded screws 21. Upstanding pins 22 are mounted upon the block 12 in the vicinity of the lugs 20. A plunger 23 is slidably mounted in the standard 17 and the said plunger is provided at its upper end with an enlarged head 24. A spring 25 bears at its lower end against the standard 17, and at its upper end against the under side of the head 24, and is under tension with a tendency to hold the plunger 23 in an elevated position in the standard 17.

A lever 26 is fulcrumed in the upper portion of the standard 17 and is provided with a cam end 27, against which the upper side of the head 24 bears.

A shuttle member 28 is slidably mounted upon the upper surface of the block 12 below the lower portion of the standard 17, and the said shuttle member carries in the vicinity of its ends spring pressed pivoted pawls 29. The shuttle member 28 is provided at that side opposite the side thereof at which the pawls 29 are mounted with outstanding pins 30. A coiled spring 31 is adapted to be connected at one end with one of the pins 30, and at its other end with one of the pins 22, and is under tension with a tendency to normally hold the shuttle member 28 toward one of the screws 21. A bar 32 is pivotally connected at its upper end with the lever 26 by means of a screw 33, and the bar is provided at its lower end with a cam 34, adapted to engage that pin 30 other than the one with which the spring 31 is attached. The screw 33 may be positioned at either side of the lever 26, and consequently, the bar 32 may be positioned at either side of the said lever and may engage either one of the pins 30. Also the spring 31 may be engaged with either one of the pins 30 and with either one of the pins 22.

Gage plates 35 are adjustably mounted at the opposite sides of the standards 17 and the said gage plates may be lowered into the paths of movement of the pawls 29, thereby one or the other of the said pawls may be held back against the tension of its actuated spring when one of the said gage plates is lowered. The gage plates 35 are provided with shanks 36 having slots 37, and the said shanks bear directly against the opposite sides of the standards 17. Guide screws 38 pass through the lowermost slot 37 and are connected at their inner ends with the standard 17. Set screws 39 pass through the uppermost slots 37 and are threaded in the standard 17 at their inner ends. By loosening the set screws 39 the shank 36 and gage plate 35 are rendered free to move vertically with relation to the standard 17. When the said set screws 39 are tightened, the said gage plates are secured at adjusted positions.

In operation the blade of the saw, indicated at 40, is positioned upon the plate 14 and the handle of the saw is secured to the bracket 6 by means of the hook 10, hereinbefore described. One end of the blade of the saw is inserted in the groove 3 of the block 2. Prior to tightening the nut 11 upon the hook 10, the teeth of the saw are brought in close proximity to the side of one of the gage plates 35, which is lowered into the path of movement of the pawl 29 located immediately behind the said gage plate, whereby the said pawl is held back from the teeth of the saw blade. At this time the other gage plate 35 is elevated, whereby the other pawl 29 may have contact with the teeth of the saw. The screw 16 is adjusted in the shelf 13 so that the plate 14 is brought at a desired angle with relation to the upper surface of the block 12. The screw 19 is then lowered in the lug 18 until its lower end is just above the upper surface of the saw blade, but not in frictional contact with the same. The free end of the lever 26 is then moved in a downward direction, whereby its cam end 27 operating against the head 24 of the plunger 23 causes the said plunger to descend and engage one tooth of the saw blade, whereby the said tooth is bent down against the upper surface of the block 12. Inasmuch as the blade of the saw is held at an angle with relation to the upper surface of the said block, the said tooth is set with relation to the blade of the saw at the same angle at which the plate 14 is disposed with relation to the upper surface of the block 12. The free end of the lever 26 is then swung in an upward direction, and inasmuch as the plunger 23 is supported by the spring 25, the said plunger moves in an upward direction in the standard 17. At the same time the bar 32 is moved in an upward direction and the cam 34 at the lower end of the said bar engages one of the pins 30 and the shuttle member 28 is moved longitudinally along the block 12 and the pawl 29, upon the said shuttle member, which is unrestrained by the gage plate 35, engages the teeth of the saw. Upon continued longitudinal movement of the shuttle member 28 in response to the movement of the cam 34 carried at the lower end of the bar 32, the pawl 29, which is in engagement with a tooth of the saw 40, moves the block 12 along the bar 1, and thus the plunger 23 is moved in position above the next tooth to be set. The movement of the shuttle member 28 is limited by the adjustment of the screws 21 so that as the block 12 moves along the bar 1, the plunger 23 skips every other tooth. Therefore, when the plunger descends at the intervals when the block 12 comes to a state of rest upon the bar 1, and throughout the extent of movement of the said block along the bar, the plunger 23 operates upon every other tooth. This swages each alternate tooth beyond one side of the blade of the saw 40.

To swage the remaining teeth beyond the opposite side of the blade of the saw 40 the block 2 and the clip 4 are reversed in their positions upon the bar 1. The saw 40 is turned over and secured to the bracket 6, as hereinbefore described, the gage plate 35 which has heretofore been in a lowered position is raised and the other one is lowered, the bar 32 is transferred from that side of the lever 26 at which it has been operated to the opposite side and the operation hereinbefore described is repeated.

An object in providing means for adjusting the bracket 6 with relation to the clip 4, is that the handle of the saw may be held approximately in a plane parallel with the upper surface of the plate 14, but in order to effect an accurate adjustment, between the blade of the saw and the upper surface of the block 12, the plate 14 is adjustably mounted and may be swung to effect minor and accurate adjustment of the saw blade.

From the above description taken in conjunction with the accompanying drawings, it will be seen that a saw set of simple structure is provided and that the same may be easily and quickly manipulated for the purpose of accurately swaging the teeth of the saw at desired angles with relation to the blade of the saw, and that the device may be used in combination with a saw irrespective of the length of the teeth of the saw.

Having described the invention what is claimed is:—

1. A saw set comprising a bar, a clip adjustably and detachably mounted upon the bar, means for securing the clip at an adjusted position upon the bar, a bracket carried by the clip, said bracket having a slot, a screw passing through the slot and engaging in the clip, means carried by the bracket for engaging the handle of a saw and tooth swaging means movably mounted upon the bar.

2. A saw set comprising a bar, means mounted upon the bar for holding a saw, a block movably mounted on the bar, a standard mounted upon the block, a shuttle member movably mounted upon the block, adjustable means for limiting the movement of the shuttle member, a swaging plunger movably mounted in the standard, a lever for moving the plunger, a spring pressed pawl carried by the shuttle member, a bar carried by the lever and adapted to move the shuttle member in one direction and a spring for moving the shuttle member in an opposite direction.

3. A saw set comprising a bar, means mounted upon the bar for holding a saw, a block movably mounted on the bar, a standard mounted upon the block, a swaging member carried by the block, a lever for moving the swaging member, a shuttle member movably mounted upon the block, means carried by the lever for moving the shuttle member, and a spring for returning the shuttle member.

4. A saw set comprising a bar, means mounted upon the bar for holding a saw, a block movably mounted upon the bar, a standard carried by the block, a tooth swaging member movably mounted in the standard, a lever for moving the said swaging member, a shuttle member movably mounted upon the block, a spring pressed pawl carried by the shuttle member, a gage plate movably mounted upon the standard and adapted to be projected into the path of movement of the said spring pressed pawl, means carried by the lever for moving the shuttle member in one direction and a spring for moving the shuttle member in an opposite direction.

5. A saw set comprising a bar, means mounted upon the bar for holding a saw, a block movably mounted on the bar, a standard mounted upon the block, a swaging member movably mounted in the standard, spring means for lifting the swaging member, a lever fulcrumed upon the standard and engageable with the swaging member to depress the same, a shuttle member movably mounted upon the block, adjustable means for limiting the movement of the shuttle member, a spring pressed pawl carried by the shuttle member, means carried by the lever for moving the shuttle member in one direction, a spring connected with the shuttle member and the block for moving the shuttle member in an opposite direction, and a gage plate movably mounted upon the standard and adapted to be projected into the path of movement of the spring pressed pawl.

In testimony whereof I affix my signature in presence of two witnesses.

JAMES P. BARKER.

Witnesses:
 STEWART KEYSER,
 W. B. SUTTON.

Copies of this patent may be obtained for five cents each, by addressing the "Commissioner of Patents, Washington, D. C."